United States Patent [19]
Lee

[11] 3,937,262
[45] Feb. 10, 1976

[54] SURE GRIP WINTER TIRE TRACTION DEVICE

[76] Inventor: Poy Lee, 52 Tennyson St., Somerville, Mass. 02145

[22] Filed: Feb. 6, 1975

[21] Appl. No.: 547,624

[52] U.S. Cl................ 152/179; 152/222; 301/44 R; 156/96
[51] Int. Cl.².......................................... B60C 7/22
[58] Field of Search............ 152/167, 169, 170, 172, 152/173, 175, 176, 178, 179, 182, 185, 187, 188, 208, 210, 221, 222, 225; 301/41 R, 44 R; 156/96

[56] References Cited
UNITED STATES PATENTS

| | | | |
|---|---|---|---|
| 1,445,485 | 2/1923 | Burton | 152/222 |
| 1,471,266 | 10/1923 | Hundeby | 152/179 |
| 2,479,474 | 8/1949 | Crooker | 156/96 |
| 3,786,849 | 1/1974 | Loqvist | 152/210 |

Primary Examiner—Robert B. Reeves
Assistant Examiner—D. W. Keen
Attorney, Agent, or Firm—Wolf, Greenfield & Sacks

[57] ABSTRACT

The device is for attachment to a vehicle tire to improve traction on ice or snow. The device is constructed from a circumferential segment of preferably a used tire and includes a plurality of studs extending through the tread area of the tire, one end of each stud for interlocking with the tread of the vehicle tire and the other end of the stud for gripping.

7 Claims, 4 Drawing Figures

U.S. Patent   Feb. 10, 1976   3,937,262
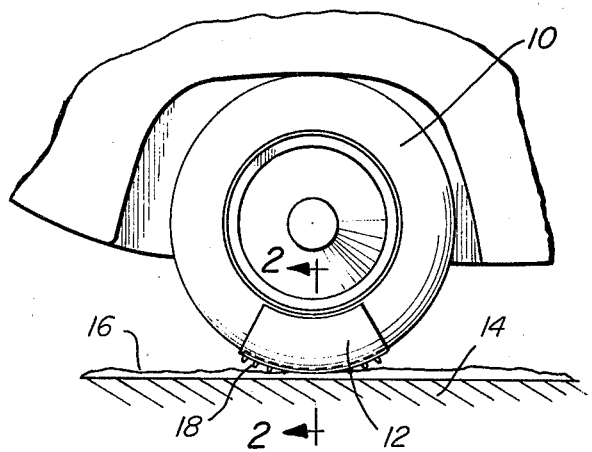
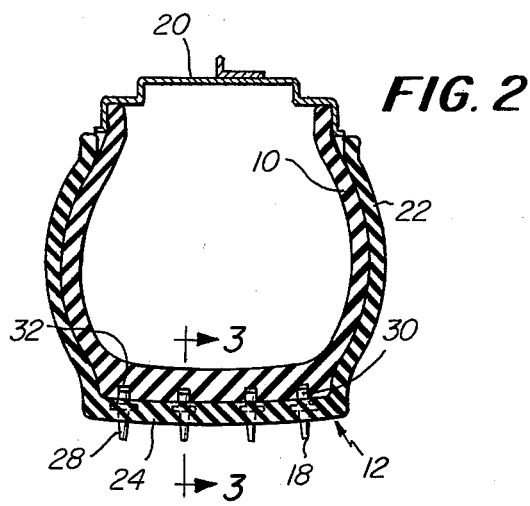
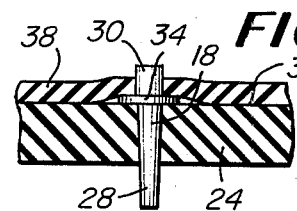
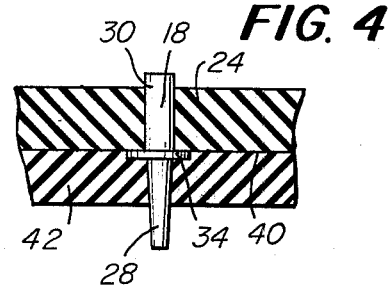

SURE GRIP WINTER TIRE TRACTION DEVICE

BACKGROUND OF THE INVENTION

The present invention relates to a traction device for attachment to one or more wheels of a vehicle. This device is easily attached to the tires of the wheel that are driven and is used for improving traction on ice or snow.

When a vehicle is stuck in snow or on a sheet or ice, in the past devices have been used to improve the traction and permit the vehicle to be moved from its stationary position. For example, a course mat may be carried in the vehicle and placed under the tire to provide some additional traction. The problem with this technique is that the traction is only provided instantaneously and usually the mat is forcibly expelled from contact with the tire upon rotation of the tire.

Other devices have been conceived such as short segments of chains. However, these devices are rather cumbersome to use and require a fastening arrangement to hold the device onto the tire.

Accordingly, one object of the present invention is to provide an improved traction device for use on one or more of the driven tires of the vehicle. Usually, one or both of the rear wheels are driven from the motor of the vehicle and thus the device of the present invention is preferably attached one to each rear tire unless one of the rear tires is in good frictionally engagement with a ground surface.

Another object of the present invention is to provide a traction device for attachment to a vehicle tire and which is readily attached to the tire and removed therefrom. The device of the present invention is preferably not for permanent attachment to the tire but is preferably attached only when the additional traction is necessary.

Another object of the present invention is to provide a device in accordance with the preceeding object and that is preferably constructed from an old discarded tire. In this way, the device can be made quite inexpensively and the old tire is in effect recycled for further use.

Another object of the present invention is to provide a traction device for attachment to a vehicle tire and which is relatively simple to construct, can be sold inexpensively, and is easily stored in the vehicle when not attached to the tire of the vehicle.

SUMMARY OF THE INVENTION

To accomplish the foregoing and other objects of this invention, there is provided a device for attachment to a vehicle tire to improve the traction of the tire with a surface upon which the tire rests such as a normal ground surface. The device may be for attachment to one or both of the rear wheels of a vehicle. The device generally comprises an arcuate segment of a tire which is preferably a used discarded tire. The segment of the tire is usually cut from a tire which is larger in size than the vehicle tire to which the segment is to be attached so that the device fits properly over the vehicle tire. A plurality of studs are provided, each having opposite ends and preferably also including an intermediate flange. The tire segment has means for receiving one end of the stud and means are usually provided for holding the stud in a fixed position in the segment with the other end of the stud extending inwardly of the inner surface of the tire segment. With the stud essentially extending in both directions from the tire the outer end of the stud is used for gripping the road surface and the inner end of the stud is adapted to fit within the vehicle tire tread so that the device is held in place.

In accordance with the method of the present invention, the device can be constructed in one of two ways. The stud can be pierced through the old tire and a liner can be inserted inside the tire to hold the stud in place. In the preferred embodiment the stud is also inserted through the tire and the outer surface of the tire is recapped in a well known manner.

BRIEF DESCRIPTION OF THE DRAWINGS

Numerous other objects, features and advantages of the invention should now become apparent upon a reading of the following detailed description taken in conjunction with the accompanying drawings, in which:

FIG. 1 shows the device of the present invention attached to a vehicle tire;

FIG. 2 is a cross-sectional view taken along line 2—2 of FIG. 1;

FIG. 3 is a cross-sectional view taken along line 3—3 of FIG. 3 but without showing the vehicle tire; and FIG. 4 shows an alternate arrangement for holding the stud in place in the device.

DETAILED DESCRIPTION

FIG. 1 shows a vehicle tire 10 having the device 12 of the present invention attached thereto. The tire 10 is resting upon a ground surface 14 that may have a cover of ice of snow 16 thereover. In FIG. 1 there is shown a series of studs 18 extending from the device 12 which provide additional gripping as the tire rotates to improve traction between the tire and the ground surface.

FIG. 2 is a cross-sectional view taken along line 2—2 of FIG. 1 and shows the tire rim 20 which is typically constructed of metal and the vehicle tire 10. The device 12 substantially surrounds the tire 10 as shown in FIG. 2 but only extends for a segmented portion of the tire.

The device 12 is preferably constructed from a discarded tire and is preferably selected to be slightly larger than the vehicle tire. For example, if the vehicle tire is an E78–14 then the tire from which the device 12 is constructed may be a G78–14 tire. Typically, about six segments may be cut from an old tire to provide six separate segments.

As indicated in FIG. 2, the tire segment 12 includes a sidewall 22 and a tread area 24. A plurality of studs 18 are disposed in the tread area 24. Each of these studs includes a bottom end 28 for gripping with the road surface as indicated in FIG. 1 and a top end 30 which is mated with the tread 32 in the vehicle tire 10. It is this mating of the top end of the studs into the existing tire tread that provides a locking action of the device to the vehicle tire 10.

FIG. 3, which is a cross-sectional view through one embodiment of the invention shows the stud 18 with its top end 30 and its bottom end 28. FIG. 3 also shows the tread area 24 which may be provided with a passage for accommodating the stud 18. This stud also includes a flange 34. In accordance with one method of constructing the device of this invention, the stud 18 is passed through the tread area 24 until the flange 34 hits the inner surface 36. A liner 38 is then fitted within the segment 12. This liner may be glued in place within the tire and is adapted to hold all of the studs in place. It is noted in FIG. 3 that the top end 30 of the stud extends above the liner 38 so that this end can mate with the tread in the tire 10 thereby providing the interlocking previously mentioned.

In accordance with another method which is a preferred method of holding the studs in place, reference is now made to FIG. 4. There is shown in FIG. 4 the stud 18 with its ends 30 and 28. FIG. 4 also shows the tread area 24 of the device. In accordance with this method of construction the stud 18 is passed through a passage or is pierced through the tread area 24 at the proper position. The flange 34 then rests upon the outer surface 40. Thereafter, a rubber layer or synthetic layer 42 is recapped onto the tire and is dimensioned so that the lower end 28 of the stud extends sufficiently down as shown in FIG. 4 to provide sufficient gripping action.

It is noted in FIGS. 3 and 4 that the stud preferably has a straight top section and a tapered lower section. The stud may be either square, rectangular or circular in cross-section.

Having described a limited number of embodiments of the present invention, it should now become apparent to those skilled in the art that there are numerous other embodiments and modifications of the embodiments disclosed herein, all of which are comtemplated as falling within the spirit and scope of the present invention.

What is claimed is:

1. A device for attachment to a vehicle tire to improve traction of the tire with a surface upon which the tire rests, said device comprising an arcuate segment of a tire which is slightly larger than the vehicle tire so that the segment can be attached to the vehicle tire, a plurality of studs each having opposite ends, said segment having means for receiving the stud with one end of the stud extending radially outwardly of the vehicle tire and means for holding the stud in fixed position in the segment with the other end of the stud extending radially inwardly of the inner surface of the tire segment for mating with the vehicle tire tread.

2. A device as set forth in claim 1 wherein each stud has a flange intermediate its ends.

3. A device as set forth in claim 2 wherein said means for holding includes, in combination, said flange and a recapped portion covering said segment.

4. A device as set forth in claim 2 wherein said stud has a long end extending from the flange and a shorter end extending from the flange.

5. A device as set forth in claim 4 wherein said long end is tapered.

6. A device as set forth in claim 5 wherein said short end extends a shorter distance inwardly than the long end extends outwardly.

7. A method of fabrication a device for attachment to a vehicle tire to improve traction of the tire with a surface upon which the tire rests, said device being fabricated from an arcuate segment of a tire which is slightly larger than the vehicle tire and a plurality of studs, said method comprising the steps of providing a plurality of passages in the tire segment for accommodating the studs, inserting the studs into each passage with the stud extending in both directions from the tire and recapping the outer surface of the tire segment to hold the studs in place.

* * * * *